United States Patent
Thione et al.

(10) Patent No.: US 7,562,383 B2
(45) Date of Patent: *Jul. 14, 2009

(54) SYSTEMS AND METHODS FOR A DYNAMIC USER INTERFACE PROXY USING PHYSICAL KEYS

(75) Inventors: Giovanni L Thione, San Francisco, CA (US); Jonathan Trevor, Santa Clara, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 854 days.

This patent is subject to a terminal disclaimer.

(21) Appl. No.: 11/111,106

(22) Filed: Apr. 20, 2005

(65) Prior Publication Data

US 2006/0242687 A1    Oct. 26, 2006

(51) Int. Cl.
*H04L 21/00* (2006.01)
(52) U.S. Cl. .......................................... 726/4
(58) Field of Classification Search .................. 726/4
See application file for complete search history.

(56) References Cited

U.S. PATENT DOCUMENTS

2006/0043164 A1* 3/2006 Dowling et al. ............. 235/375

OTHER PUBLICATIONS

Bruce Schneier, "Applied Cryptography Second Edition: protocol,a algorithms, and source code in C", 1996, John Wiley & Sons, USA.
RSA Security, "Protecting Against Phishing By Implementing Strong Two-Factor Authentication", RSA Security, Document No. PHISH WP 0904, 2004.

"Encentuate TCI Components", downloaded on or about Feb. 28, 2005 from www.encenuate.com/products/tci-components.htm.
RSA Smart Badging and RSA SecriID USB Tokens: Securing Enterprise Resources, A White Paper for IT and business managers, Document No. SDSB WP 0903, 2003.
Bruce Chaput, Chris Carroll, "RSA SecurID Solutions: A Foundation for Enterprise Quality and Reliability", Document No. QUAL WP 1104, Nov. 19, 2004.

(Continued)

*Primary Examiner*—Andrew L Nalven
(74) *Attorney, Agent, or Firm*—Sughrue Mion, PLLC

(57) ABSTRACT

Techniques are provided for dynamically connecting and transforming user interface events between user and generic devices based on physical keys. A user and a user device are determined. The user device is authenticated based on a login sequence, smartcard or the like. A physical key associated with the user is physically associated with a generic device by insertion, wireless link, proximity, RFID detection and the like. The dynamic association is communicated over a first communications channel. A user device confirms the dynamic association over a second communications channel. The dynamically associated generic device communicates user interface events with the dynamic user interface proxy. The user device also communicates user interface events with the dynamic user interface proxy. The dynamic user interface proxy receives, optionally transforms and routes the user interface events associated with the user device and the generic device. The dynamic user interface proxy routes received user interface events to the respective devices based on the dynamic associations between a user, a user identifier and devices associated with the user's physical key. Intermodal user interface events are optionally transformed by the dynamic user interface proxy based on internal and/or externally accessible transformation functions.

44 Claims, 7 Drawing Sheets

OTHER PUBLICATIONS

Electronics for Imaging Inc., "EFI PrintMe", downloaded on or about Mar. 14, 2005 from www.efi.com/products/printme/index.html, EFI, 2005.

"GoToMyPC: Our Technology", downloaded on or about Mar. 14, 2005 from www.gotomypc.com.

Sten Lannerstrom, "SunTrust White Paper on Mobile Authentication", SunTrust, Document No. MPM 02:00241 Revison A, Aug. 9, 2002.

David Colin, "NEC Wireless MT1065" product review downloaded from www.projectorcentral.com/wireless_nec_mt1065.htm, Jan. 31, 2003.

Selenty, "X-Micro Bluetooth USB Dongle" in PC Hardware Reviews, Jun. 6, 2003 downloaded from 222.pchardware.ro.

U.S. Appl. No. 11/111,348, Giovanni L. Thione.

* cited by examiner

| USER IDENTIFIER | USER DEVICE IDENTIFIER | PHYSICAL KEY IDENTIFIER | GENERIC DEVICE IDENTIFIER |
|---|---|---|---|
| GLTHIONE123 | PL87D5HJ7N | 34FCG87654 3212H | G65DREWSQ34678 |
| . | . | . | . |
| . | . | . | . |
| JTREVOR112 | 986HDGFR54 | K9765GGGSFDD98 | J9876HSS654311D |

Fig. 5

| DEVICE IDENTIFIER | NAME | INPUT CAPABILITIES | OUTPUT CAPABILITIES |
|---|---|---|---|
| PL87D5HJ7N | MOTOROLA CELLPHONE XYZ | SOUND.PASSTHROUGH="TRUE"; SOUND.SPEECH.RECOGNITION="COMMAND_SET1"; TACTILE.KEYBOARD="US_10KEY"; TACTILE.KEYBOARD.CURSOR="2"; | SOUND.PASSTHROUGH="TRUE"; SOUND.SPEECH.SYNTHESIS="FTP://SERVICE_PROVIDER .USERS/USERID/CONFIGURATION/SPEECH/SYNTHESIS/ MODEL.CFG"; |
| H7654FS9KM | JABRA BLUETOOTH HEADSET | SOUND.PASSTHROUGH="TRUE" | SOUND.PASSTHROUGH="TRUE" |
| 8765HSAAAA | PHILIPS HDTV | TACTILE.BUTTONS="STANDARD TV COMMANDS" | VISUAL.MONITOR="HDTV" |
| . | . | . | . |
| . | . | . | . |
| 986HDGFR54 | MFG | TACTILE.KEYBOARD="US_10KEY"; TACTILE.KEYBOARD.CURSOR="2"; | TACTILE.DYNAMIC_BRAILE="US_STANDARD"; |

SYSTEMS AND METHODS FOR A DYNAMIC USER INTERFACE PROXY USING PHYSICAL KEYS

INCORPORATION BY REFERENCE

This Application is related to: entitled "SYSTEMS AND METHODS FOR DYNAMIC AUTHENTICATION USING PHYSICAL KEYS" by Giovanni L. THIONE et al., filed on an even date herewith, as U.S. patent application Ser. No. 11/111,348 herein incorporated by reference in its entirety.

BACKGROUND OF THE INVENTION

1. Field of Invention

This invention relates to user interface processing.

2. Description of Related Art

As computing devices have come to pervade the environment, users must contend with an increasing variety of interfaces. Manufacturers have attempted to respond to these challenges by providing different versions of their application user interfaces for each device platform. For example, Windows CE is a version of the Microsoft Windows® user interface supporting features found on smaller computing devices. The Windows XP user interface typically supports computing devices with larger displays, full size keyboards and the like. Although these conventional systems of providing user interfaces allow the use of a variety of devices, porting of the operating system, application and associated user interface to the target device is required.

The users of portable and other computing devices show increasing interest in customizing or personalizing the user interface. However, conventional systems lack mechanisms for portable personalization or customization of user interfaces across ranges of ubiquitous devices. Moreover, users are reluctant to trust ubiquitous devices due to the risk that passwords and/or other sensitive information may be captured. Therefore, systems and methods that dynamically link ubiquitous devices with user interfaces based on a physical key would be useful.

SUMMARY OF THE INVENTION

The system and methods of this invention provide for a dynamic user interface proxy using physical keys. The dynamic user interface proxy determines a user, a user device, a physical key and previously determined associations between user devices and physical keys. A physical key that was previously associated with the user is dynamically associated with a generic device by a contact and/or contactless connector. A proposed dynamic association is communicated to the dynamic user interface proxy over a first channel. The dynamic user interface proxy authenticates the generic device based on the physical key and a confirmation from the user device over a second channel. User interface events generated by the user device and/or the generic device are transformed and routed by the dynamic user interface proxy based on the user's physical key and determined associations between the user identifier, the user devices and the generic devices.

BRIEF DESCRIPTION OF THE DRAWINGS

FIG. 5 is an exemplary data structure for storing authentication information according to this invention;

FIG. 6 is an exemplary data structure for storing device information according to this invention;

DETAILED DESCRIPTION OF EXEMPLARY EMBODIMENTS

Figure 1:
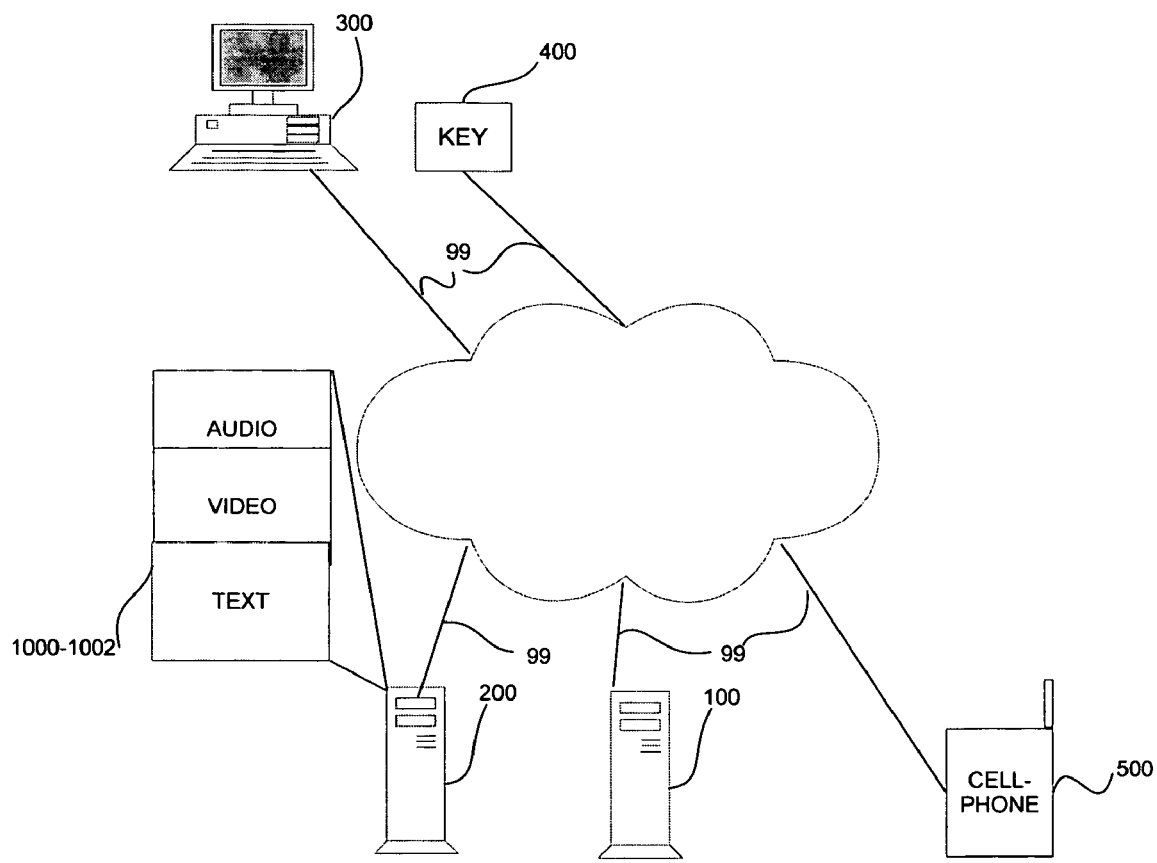
FIG. 1 is a first overview of an exemplary dynamic user interface proxy according to this invention.

FIG. 1 is a first overview of an exemplary dynamic user interface proxy 100 according to this invention. The dynamic user interface proxy 100 is connected via communications links 99 to: a communications-enabled personal computer generic device 300; a physical key 400; a cell phone user device 500; and to an information repository 200 providing access to audio, video and/or textual information 1000-1002.

A dynamic association is proposed between the communications-enabled personal computer generic device 300 and the user's physical key 400. The proposed dynamic association is communicated to the dynamic user interface proxy over a first channel or communications link. The proposed dynamic association between the communications-enabled personal computer generic device 300 and the physical key 400 is based on proximity, inter-device communication, a login key sequence, and/or any known or later developed method of associating generic devices with the physical key 400. For example, in one embodiment, a proposed association is determined by placing the physical key 400 within a 6 inch sensing distance of the communications-enabled personal computer generic device 300. In order to further increase security, the physical key 400 contain an optional cryptographic key. The optional cryptographic key is used to sign the device identifier associated with the communications-enabled personal computer generic device 300. The signed device identifier is then forwarded to the dynamic user interface proxy 100. The dynamic user interface proxy cryptographically verifies the signature as associated with the user's physical key 400. If the cryptographic signature is verified against previously stores values associated with the physical key 400, a proposed dynamic association between the physical key 400 and the communication-enabled personal computer generic device 300 is established.

The physical key 400 contains information operable to propose a dynamic association between a user and/or user identifier and the communications-enabled personal computer generic device 300. That is, the physical key 400 is used to propose dynamic associations allowing a generic device to send or receive user interface events associated with the user device. In various exemplary embodiments, the physical key 400 is a USB device containing software codes execute-able by the communications-enabled personal computer generic device 300, a smartcard device containing a processor and the like. The physical key 400 may also contain software codes capable of controlling the generic device, capable of driving the generic device to load and/or execute software codes, software instructions or the like.

The identifier associated with the physical key 400 is communicated over communications links 99. However, in other exemplary embodiments, the physical key 400 is connected directly to the communications-enabled personal computer generic device 300 using a connection based on Ethernet USB, firewire, parallel or serial ports, Memorystick ports, Bluetooth, WiFi, WiMax connectors and/or any other known or later developed connector and/or communications medium.

The user of the cell phone user device 500 confirms the proposed dynamic association over a second communications channel. The communications-enabled personal computer generic device 300 is then enabled to receive user interface events from the dynamic user interface proxy 100. In various exemplary embodiments according to this invention, the user device is enabled based on a login key sequence, a voice print, a biometric identifier and/or using any other authentication method. Thus, the authentication of the user of the cell phone user device 500 enables the cell phone user device 500 to send and receive user interface events associated with the user.

The association of the physical key 400 with the communications-enabled personal computer generic device 300 enables the routing of user interface events from the dynamic user interface proxy 100 to the communications-enabled personal computer generic device 300. The dynamic user interface proxy 100 determines the user interface capabilities of the cell phone user device 500 and the input/output capabilities of the communications-enabled personal computer generic device 300. The confirmed dynamic association of the physical key 400 with the communications-enabled personal computer generic device 300 operates to selectively re-direct user interface events from the input/output components of the communications-enabled personal computer generic device 300 to the dynamic user interface proxy 100. The user confirms the association over a second communications channel using the dynamic cell-phone user device 500.

The confirmation of the dynamic associations by the user of the cell-phone user device 500 re-directs user interface events from the input/output components of the cell phone user device 500 to the dynamic user interface proxy 100. In various exemplary embodiments, processing services such as translation services, transformation services, conversion services and the like may be called as virtual devices within the dynamic user interface proxy architecture. The virtual devices are operable to receive input from, and to forward output to, physical devices and/or other virtual devices. This facilitates the integration of the physical devices and services within the architecture of the dynamic user interface proxy 100.

The user interface events accepted by the cell phone user device 500 are dynamically transformed by the dynamic user interface proxy 100 using optional web-services and/or other transformation, translation and/or conversion mechanisms. The dynamic user interface proxy transforms the user interface events into user interface events appropriate to the communications-enabled personal computer generic device 300. The user interface events are then forwarded over communication links 99 to the communications enabled personal computer 300.

For example, in one exemplary embodiment according to this invention, a Microsoft PowerPoint® presentation contained within the file 1000 is loaded onto the communications-enabled personal computer generic device 300. The Microsoft PowerPoint® presentation is then executed. If the entry of keystrokes is required to navigate between slides in the presentation, the physical key 400 loads software codes and/or activates hardware keyboard re-direction routines for the communications-enabled personal computer generic device 300. The software and/or hardware re-direction routines route the keyboard and/or other user interface events of the Microsoft PowerPoint® presentation to the dynamic user interface proxy 100. The user interface events usually generated by the keyboard of the communications-enabled personal computer generic device 300 are instead generated by the cell phone user device 500 and forwarded to the dynamic user interface proxy 100. The dynamic user interface proxy 100 connects or routes the user interface events of the cell phone user device 500 to the user interface events of the communications-enabled personal computer generic device 300.

The keyboard and the speech input from the cell phone user device 500 are forwarded to the dynamic user interface proxy 100. The speech input received by the dynamic user interface proxy is transferred to an internal and/or external speech recognizer circuit, routine or device. The dynamic user interface proxy 100 transforms the recognized speech information into a user interface event appropriate for the keyboard of communications-enabled personal computer generic device 300.

In various exemplary embodiments according to this invention, the dynamic user interface proxy 100 translates speech based user interface events from the cell phone user device 500 into keyboard based user interface events for the communications-enabled personal computer generic device 300 using a web-service based speech recognizer, a hardware speech processor or the like. It will be apparent that text-to-speech, visual-to-tactile and/or various other user interface event transformations can also be used in the practice of this invention.

Figure 2:
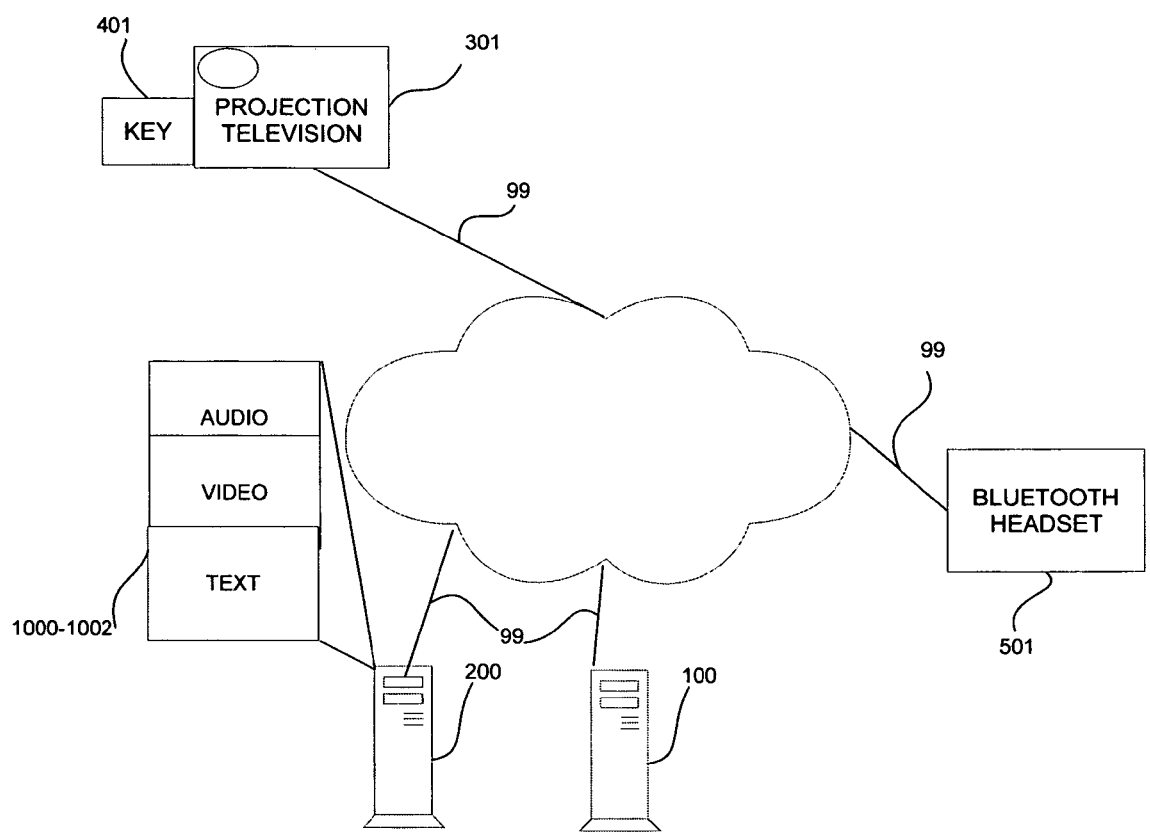
FIG. 2 is a second view of an exemplary dynamic user interface proxy according to this invention.

FIG. 2 is a second view of an exemplary dynamic user interface proxy 100 according to this invention. The dynamic user interface proxy 100 is connected via communications links 99 to: a headset user device 501; a projection television generic device 301 and a USB physical key 401.

The user of the headset user device 501 is authenticated to the dynamic user interface proxy 100. The headset device 501 may be a wireless Bluetooth-enabled headset, a wired headset and/or any other type of headset. The authentication of the user is based on the receipt of a login key sequence, a MAC address encoded into the device, a biometric identifier and/or any known or later developed information or method useful in authenticating the user. The capabilities of the authenticated headset user device 501 are then determined.

The headset user device 501 provides embedded speech recognition, headset push buttons and/or various other user interface capabilities. The various capabilities of the headset user device 501 are determined based on a lookup table, a dynamic query of the manufacturer's web-service or the like.

The USB physical key 401 is used to request a dynamic association with the projection television generic device 301. The USB physical key 401 forwards the proposed dynamic association of the physical key with the projection television generic device 301 over a first channel to the dynamic user interface proxy 100. The USB physical key 401 may be associated with the projection television generic device 301 by inserting the USB physical key 401 into a USB port in the projection television generic device 301. In other embodiments, the physical key 401 is a smart card, a memory stick, a parallel and/or serial port device and/or any other known or later developed physical key device. In still other embodiments, the physical key is a paper-based bar code, a radio frequency identification (RFID) tag and/or any physical device operable to propose a dynamic association between the projection television generic device 301 and the physical key 401. The proposed dynamic association is then confirmed by the user device 502 using a second communications channel.

The user interface capabilities of the projection television 301 are then determined. In one of the exemplary embodiments according to this invention, the input/output capabilities for the generic and the user devices are stored in a data structure for storing device information. The data structure for storing device information is embedded within the dynamic user interface proxy 100 or may be placed at any other location accessible via the communications links 99.

In various other embodiments, the user interface capabilities of a device are determined by querying a device information repository provided by the manufacturer or the like. The capabilities of the generic device and/or user devices are determined by querying the device information repository via a web-service, a remote procedure call (RPC), a remote method invocation (RMI) or the like. For example, in one embodiment, the user interface capabilities of the projection television generic device are determined by calling the manufacture's device information web-service. The capabilities and/or information about the application programmers interface (API) for the projection television device are exposed to the dynamic user interface proxy 100 through a Universal Description Discovery and Integration (UDDI) service or the like.

The dynamic user interface proxy 100 optionally calls one or more services to translate between different modes of user input. Thus, a stream of speech information received from the headset user device 501 is forwarded to an external web-service for processing. The external web-service is optionally accessed as a virtual device which accepts input and generates output based on the user interface event.

For example, command type user interface events are typically time sensitive. Therefore, web-service requests to translate commands are forwarded to a locally available web-service helping to reduce latency. However, in a transcription environment, the speech information to be recognized is forwarded to a more accurate, remote web-service, at the cost of increased latency. These services may be addressed as virtual devices registered with the dynamic user interface proxy 100. The virtual device interface facilitates the transformation of speech based commands into recognized speech by providing a simplified device oriented interface.

The dynamic user interface proxy 100 optionally calls one or more virtual devices to transform the recognized speech into commands to be forwarded to the projection television generic device 301. The transformations associated with the virtual devices may include web-services, remote method invocations (RMI), remote procedure calls (RPC) and the like. In this case, a spoken "next channel" command received by the headset user device 501 is recognized and transformed by one or more virtual devices into commands appropriate to change the channel on the projection television generic device 301.

Figure 3:
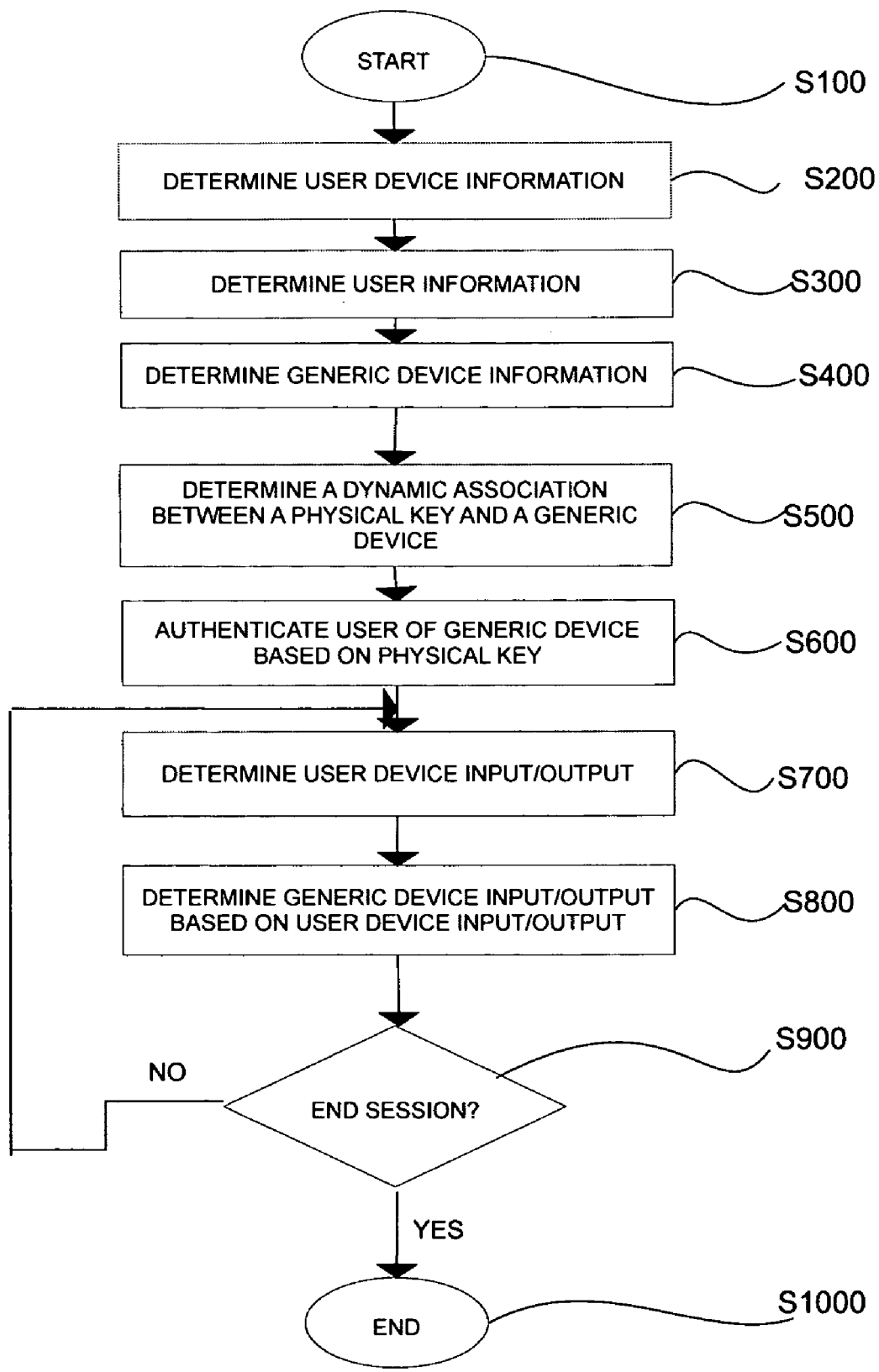
FIG. 3 is a flowchart of an exemplary method to proxy user interface events according to this invention.

FIG. 3 is a flowchart of an exemplary method to proxy user interface events according to this invention. The process begins at step S100 and immediately continues to step S200.

In step 200 the information about the user device is determined. The user device may include a cell phone, a Bluetooth-enabled headset, a personal digital assistant and/or any known or later developed user device capable of providing user interface events. The user interface capabilities of the user device are determined based on the determined device capabilities information. For example, a cell phone user device may offer both keyboard and speech input capabilities. In contrast, a Bluetooth-enabled headset may only offer audio output and speech input capabilities. These capabilities may be determined dynamically by querying the device, querying the website of the device manufacturer and the like. In still other embodiments according to this invention, the capabilities are determined by reference to a static device information data structure describing recognized devices and/or classes of devices. After the user device has been determined, control continues to step S300.

Information about the user is determined in step S300. For example, in one embodiment, the user is identified to the dynamic user interface proxy 100 through the use of a user identifier and an optional password. In various other embodiments according to this invention, the user identifier information is optionally used to select a personalized user interface.

For example, when a user authenticates themselves to the dynamic user interface proxy with a user device, the user device serves as a substitute user interface for a generic device. The login sequence or other authentication method can be based on a key sequence, a voice print, implied authentication based on device identifier numbers such as MAC addresses or the like.

Thus, a speech recognition model specifically trained or adapted to the user is easily loaded into devices not owned by the user. The personalized speech recognition model is more accurate in recognizing the user's speech. Moreover, the dynamic loading of speech recognition models allow user and task specific recognition models to be loaded based on the context of the user interface events. Thus, in one exemplary embodiment, a speech recognition model capable of recognizing presentation oriented navigation commands is loaded by a speaker before giving a presentation. It will be apparent that additional processing may be performed on user interface events by defining virtual devices that receive input information and further transform the received input information to produce transformed output information. After the user information has been determined, control continues to step S400.

In step S400 a generic device is determined. The user interface events from the determined generic device are mediated by the dynamic user interface proxy. The delayed binding of the user interface events to the physical devices facilitates cross modal transformations. Thus, a generic device and/or a user device originally designed to accept only tactile keyboard based user interface events can be extended to handle speech and/or other types or modes of user input. The generic devices may include, but are not limited to, copy machines, personal computers, projectors, televisions, radios, digital jukeboxes, telephones and/or any known or later developed device capable of human sensible input and/or output. After the generic device has been determined, control continues to step S500.

A dynamic association between a physical key and a generic device is determined in step S500. In one exemplary embodiment, the physical key is associated with an identifier. The identifier is in turn associated with a specific user. Thus, the presence of the physical key within a generic device or within the sensing distance of the generic device, indicates a proposed dynamic association between the physical key and the generic device. Once confirmed, the dynamic association indicates the users assent to the processing of user interface events on the generic device. That is, the presence of the physical key indicates that the user trusts the generic device not to store and/or inappropriately re-direct the user interface events and trusts the generic device to access potentially sensitive information. The proposed dynamic associations of the physical key and the generic device is forwarded to the dynamic user interface proxy over a first channel or communications link established by the physical key and/or provided by the generic device. A user device then confirms the proposed dynamic association over a second channel or communications link.

In one exemplary embodiment, the physical key contains software and/or hardware routines and/or an address from which software routines are loaded. The software and/or hardware circuits or routines specify how the generic device will process user interface events. The physical key provides authentication and in some cases loads software that provides an abstraction and/or application programmer interface to the generic device. The dynamic user interface proxy accepts user interface events from the user device. The dynamic user interface proxy may perform transformations necessary to convert the user interface events originating with the user device into user interface events appropriate for the generic device. The transformed user interface events are transmitted over a communications link to the dynamic user interface proxy. The WiFi, Bluetooth, General Packet Radio, infrared and/or other communications link is provided by the physical key and/or by the generic device. The physical key then transmits the transformed user interface events to the generic device. It will be apparent however that in various other exemplary embodiments, the physical key is a passive rather than an active physical key and the transformed user interface events are forwarded directly between the generic device and the dynamic user interface proxy. Moreover, it will be apparent that in still other embodiments, the dynamic user interface proxy may be embedded in the physical key, a user device, a generic device or placed at any other location accessible over the communications link 99.

The physical key can be used to determine the make, model and/or other characteristics useful in determining the capabilities of the generic device. For example, the physical key may contain code or a component device operable to receive the make, model and/or other information about the generic device. A device identifier such as manufacturer, model and serial number or the like, is then returned to the dynamic user interface proxy. The dynamic user interface proxy then uses the device identifier to determine the appropriate drivers to be used in generating and processing user interface events associated with the generic device.

The proposed dynamic association between the physical key and the generic device is determined by inserting the physical key into the device, placing the physical key within the signal range of the Bluetooth, infrared, WiFi and/or other communication medium incorporated by the generic device. For example, a Memorystick based physical key is associated with a corresponding generic device when the memory stick is inserted into the memory stick receptacle of the generic device. Dynamic associations with USB, a serial port, a parallel port and/or other contact-based physical keys are proposed by inserting the physical key into the USB serial, parallel or other contact-based connection or receptacle of the generic device. After the dynamic association of the physical key and the generic device has been determined, control continues to step S600.

In step S600, the user of the generic device is authenticated based on the physical key. In one embodiment, an identifier associated with the physical key is transmitted from the physical key through the generic device and on to the dynamic user interface proxy. The dynamic user interface proxy compares the received identifier to the value stored in an authentication store. The authentication store associates physical keys with users, user devices and with generic devices. The physical key associated with the received key value is then verified. The generic device associated with the physical key is in turn authenticated based on the physical key.

In another exemplary embodiment according to this invention, the MAC address, internet protocol (IP) address and/or other generic device identifier is cryptographically signed with a cryptographic signing key associated with the physical key. The signed MAC, IP or other address is then forwarded to the dynamic user interface proxy. The dynamic user interface proxy verifies the cryptographic signature and associates the generic devices identified by the MAC, IP or other address, with the user. After the user of the generic device is authenticated, control continues to step S700 where the user interface events for the user device are determined.

The user device interface events include voice commands, mouse movements, touchpad selections and/or any other user interface events to be routed to the user device. After the user interface events of the user device have been determined, control continues to step S800.

In step S800, the user interface events of the generic device are determined. In one embodiment, the user interface events for a generic device are determined based on user interface events associated with the user device. Thus, an exemplary "next channel" voice command user input entered on the cell phone user device is transformed by the dynamic user interface proxy server into a "next channel" action on the generic device. However, it will be apparent that various mappings or associations between user device and generic device user interface events may be created using the methods of this invention. After the generic user interface events have been determined, control continues to step S900.

In step S900, a determination is made as to whether the proxy session is to be terminated. The session may be terminated by a user logoff sequence, a timeout, programmatically or the like. If the session is not terminated, control jumps to step S700. Steps S700-S900 are then repeated until a determination is made in step S900 that the session is to be terminated. Control then continues to step S1000 and the process ends.

Figure 4:
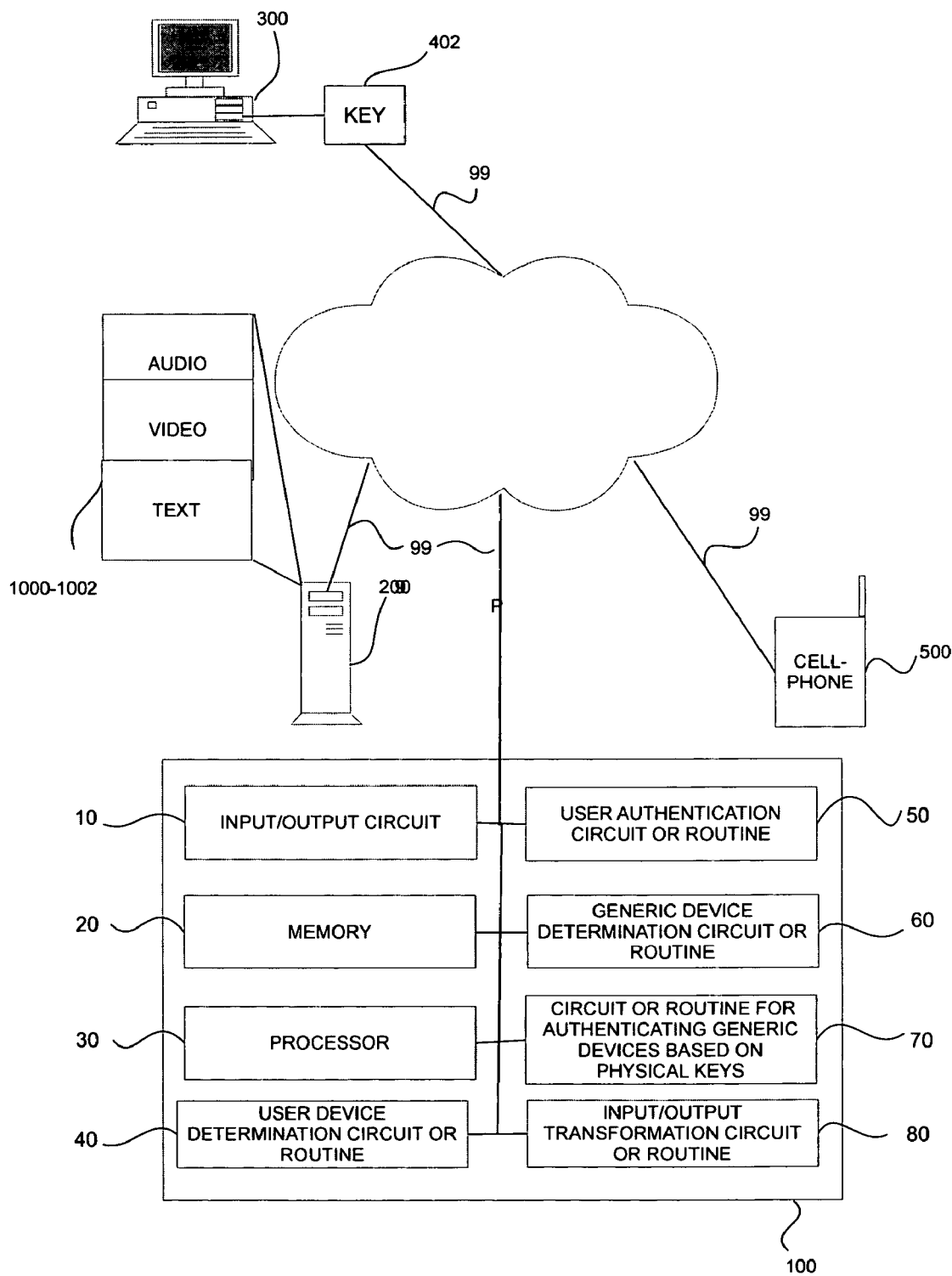
FIG. 4 is an exemplary dynamic user interface proxy according to this invention.

FIG. 4 is an exemplary dynamic user interface proxy 100 according to this invention. The dynamic user interface proxy 100 comprises: a memory 20; a processor 30; a user device determination circuit or routine 40; a user authentication circuit or routine 50; a generic device determination circuit or routine 60; a circuit or routine for authenticating generic devices based on physical keys 70; and an input/output transformation circuit or routine 80; each connected to input/output circuit 10 and via communications links 99 to: a communications-enabled personal computer 300; a physical key 402; the cell phone user device 500 and an information repository 200 containing audio/video, text and other documents 1000-1002.

The dynamic user interface proxy 100 activates the authentication circuit or routine 50 to authenticate the user of the cell phone user device 500 based on a login key sequence, biometric information and/or any other known or later developed authentication method.

The user device determination circuit or routine 40 is activated to identify the user device associated with the user and to determine the capabilities of the user device. Thus, the user device determination circuit or routine 40 determines the user interface capabilities of the cell phone user device 500. For example, an identifier associated with the user and/or an identifier communicated by the cell phone user device 500 can be used to authenticate and associate the cell phone user device 500 with the user. The capabilities of the authenticated cell phone user device 500 are then determined by querying a device information storage structure previously stored in memory 20. It will be apparent however, that the device information storage structures can be placed at any location accessible via communications links 99 without departing from the spirit or scope of this invention.

The generic device determination circuit or routine 60 is then activated to proposed a dynamic association between the communications-enabled personal computer 300 and the physical key 402. In various exemplary embodiments, the physical key 402 contains an identifier associated with the user. The physical key 402 incorporates Bluetooth, WiFi, WiMAX, General Packet Radio Service (GPRS), infrared, Ethernet, USB ports and/or any known or later developed type of connection. An identifier associated with the physical key 402 is received by the input/output circuit 10 of the dynamic user interface proxy 100. The identifier indicates that the user proposes to dynamically associate the generic device with the physical key. A confirmation of the proposed dynamic association is sent over a second channel or communications link using the cell phone user device 500. The input/output circuit 10 of the dynamic user interface proxy 100 receives the confirmation and accepts the generic device as authorized to process user specific user interface events.

In another exemplary embodiment according to this invention, a private key associated with the physical key 402 is used to cryptographically sign the IP address of the generic device. The cryptographically signed message containing the IP address is received by the dynamic user interface proxy 100. The dynamic user interface proxy 100 verifies the cryptographically signed message to ensure the message is attributable to the physical key 402 associated with the user.

The dynamic user interface proxy 100 activates the circuit or routine for authenticating generic devices based on physical keys 70. The processor 30 verifies the signature of the received message. The user associated with the physical key 402 is then determined based on information contained in the data structure for storing authentication information stored in memory 20. The data structure for storing authentication information associates user devices and generic devices with physical keys.

The processor activates the input/output circuit or routine 10 to receive confirmation of the proposed dynamic association from the cell phone user device 500. The processor 30 then activates the input/output transformation circuit or routine 80. The input/output transformation circuit or routine 80 receives user interface events from the user and generic devices. Any required transformations and/or web-services are performed to convert user interface events between the different modes or formats. For example, tactile based user interface events are transformed into speech based user interface events and vice-versa. The processor 30 then routes the user interface events based on the dynamic associations. Thus, speech input on the cell phone user device 500 is forwarded to the input circuit 10 of dynamic user interface proxy 100. The speech based input is transformed into keyboard based input for the Microsoft PowerPoint® presentation running on the communications enabled personal computer generic device 300 associated with the physical key 400.

FIG. 5 is an exemplary data structure for storing authentication information 1100 according to this invention. The exemplary data structure for storing authentication information 1100 is comprised of a user identifier portion 1110; a user device identifier portion 1120; a physical key identifier portion 1130; and a generic device identifier portion 1140.

The first row of the exemplary data structure for storing authentication information 1100 contains the value "GLTH-IONE123" in the user identifier portion 1110. The value in the user identifier portion 1110 can be a globally unique email address and/or any identifier unique to the dynamic user interface proxy. The value in the user identifier portion 1110 associates a user with a physical key and a user device. The physical key is then dynamically associated with a generic device. The dynamic association between the physical key and the generic device is reflected in the values stored in the user device identifier portion 1120; the physical key identifier portion 1130 and the generic device identifier portion 1140. The value in the user identifier portion 1110 is optionally associated with a password. The password ensures that only the specified user can access the associated user interface events, services documents and/or devices.

If the user device is capable of transmitting a user device identifier, then the user device identifier and the user identifier are compared to previously stored entries in the data structure for storing authentication information 1100. If the received user identifier and user device identifier match the values in the data structure for storing authentication information 1100, the user device is authenticated to the dynamic user interface proxy 100.

The user device identifier portion 1120 contains the value "PL87D5HJ7N". This value identifies the user device. In some exemplary embodiments, the value in the user device identifier portion 1120 is a MAC address, a unique identifier assigned by the dynamic user interface proxy or the like.

The physical key identifier portion 1130 of the data structure for storing authentication information 1100 contains the value "34FCG876543212H". Optional encryption of the physical key value before transfer from the physical key 402 is used to prevent eavesdropping, key masquerading and/or various other security attacks. Thus, the value contained in the physical key 402 may be optionally encrypted before transmission over communications links to the dynamic user interface proxy server 100.

In still other exemplary embodiments, the physical key 402 contains software codes usable to: dynamically encrypt the key before transmission; trigger the establishment of a secure connection; and the like. However, it will be apparent that various types of cryptographic software and/or hardware can be used without departing from the spirit or scope of this invention.

The generic device identifier portion 1140 contains the exemplary value "G65DREWSQ34678". This identifies the generic device and/or the software interface information necessary to re-direct user interface events between the generic device and the user device. For example, in one of the embodiments according to this invention, the "G65DREWSQ34678" value is associated with a Dell Inspiron 2650 notebook computer. Thus, user interface events associated with the Dell Inspiron 2650 notebook computer are routed to, and received from, the dynamic user interface proxy server 100. For example, if a wireless dynamic Braille display user device is associated with a Dell Inspiron 2650 notebook computer generic device 300, then the wireless dynamic Braille display device receives display information from the Dell Inspiron 2650. The dynamic user interface proxy appropriately transforms the user interface events to drive the dynamic Braille display unit.

The last row of the exemplary authentication information data structure 1100 contains the values "JTREVOR112", "986HDGFR54", "K9765GGGSFDD98" and "J9876GHSS6543111D" in the user identifier portion 1110, the user device identifier portion 1120, the physical key identifier portion 1130 and the generic device identifier portion 1140 respectively.

The specified values indicate that user "JTREVOR112" is associated with the user device "986HDGFR54". The value in the user device identifier portion 1120 indicates a user device with dynamic Braille output capability and which has a 10 key keyboard with 2 cursor keys. The value in the physical key identifier portion 1130 indicates a USB WiFi enabled physical key device capable of transmitting information to/and from the generic device.

For example, the value "J9876HSS6543111D" in the generic device identifier portion 1140 is associated with an XYZ corporation projection television device. The XYZ Corporation projection television device has a USB port into which the physical key is inserted. User interface events initiated on the user device are routed to the dynamic user interface proxy. The dynamic user interface proxy then transforms or reformulates the user interface event based on the associated XYZ Corporation projection television device.

The transformed user interface event is then forwarded to the projection television generic device associated with the user's WiFi enabled physical key. The visual user interface event forwarded to the projection television device is dynamically transformed by the dynamic user interface proxy. The transformation reformulates the user interface event into the appropriate output mode for the user device associated with the non-sighted user. The non-sighted user associates their WiFi enabled physical key with the projection television device. The visual user interface events destined for the projection television generic device are then routed to the dynamic user interface proxy. The dynamic user interface proxy transforms the visual user interface events into the format required by the dynamic Braille user device associated with the user's physical key. The transformed user interface event is then forwarded to the dynamic Braille user device associated with the physical key.

FIG. 6 is an exemplary data structure for storing device information according to this invention. The exemplary data structure for storing device information 1200 is comprised of a device identifier portion 1210; a name portion 1220; an input capabilities portion 1230; and an output capabilities portion 1240. The first row of the exemplary data structure for storing device information 1200 contains the value "PL87D5HJ7N" in the device identifier portion 1210. This indicates in the specific type of device and/or device drivers installed in the device. The name portion 1220 contains the value "MOTOROLA CELLPHONE XYZ". This reflects the name and model of the device. This information can be used to dynamically locate drivers and/or capabilities for the named device from a manufactures web service or the like.

The input capabilities portion 1230 contains one or more strings expressing the input capabilities of the relevant device. The value "SOUND.PASSTHROUGH=="TRUE" indicates the cell phone is capable of passing sound information without additional processing. The value "SOUND.SPEECH_RECOGNITION=="COMMAND_SET1'"" reflects the voice command capabilities of the associated device. The string "TACTILE.KEYBOARD=="US_10KEY" indicates the device has a 10 digit keypad with a standard US configuration. The string "TACTILE.KEYBOARD.CURSOR=="2" indicates the device has 2 cursor keys instead of 4.

The output capabilities portion 1240 contains one or more strings describing output capabilities of the device identified by value in the device identifier portion 1210. The string "SOUND.PASSTHROUGH=="TRUE" indicates the processing of information is disabled for the output stream. The string "SOUND.SYNTHESIS=="FTP://SERVICE_PROVIDER.USERS/USERID/CONFIGURATION/SPEECH/SYNTHESIS/MODEL.CFG" indicates the name and location of the user specific speech synthesis model loaded by the device. The dynamic loading of user specific device parameters can be accomplished even when the headset and other devices are not owned by the user. For example, a non-sighted user confronted with a generic Bluetooth-enabled headset authenticates the Bluetooth enabled headset to the dynamic user interface proxy by placing a Bluetooth-enabled physical key within connection range of the headset and entering a Pin or code. A user-specific synthesized voice model is then loaded into the Bluetooth-enabled headset. The user-specific speech synthesis model reduces cognitive overhead attributed to understanding the synthesized speech while providing flexibility in the range of devices and systems that can be used.

The second row of the exemplary data structure for storing device information contains the values "H7654FS9KM" in the device identifier portion 1210. This value uniquely indicates the device to the dynamic user interface proxy. The optional name portion 1220 contains the value "JABRA BLUETOOTH HEADSET". This value indicates the name of the device, in this case, the value indicates a JABRA Bluetooth headset.

The input capabilities portion 1230 contains the value "SOUND.PASSTHROUGH="TRUE" indicating the device supports a passthrough mode. In passthrough mode, the Jabra Bluetooth headset passes the received sound information through without additional processing. The output capabilities portion 1240 contains the value "SOUND.PASSTHROUGH="TRUE" indicating the device is also capable of passing the output sound information without further processing.

The third row contains the value "8765HSAAAA", "PHILIPS HDTV", "TACTILE.BUTTONS='STANDARD TV COMMANDS'", "VISUAL.MONITOR='HDTV'". These values indicate the device identified by the device identifier value "8765HSAAAA" is a Philips HDTV and has a set of tactile buttons supporting a standard set of TV commands. The output capabilities values indicate the device supports visual HDTV output.

The last row of the exemplary data structure for storing device information contains the value "98HDGFR54" in the device identifier portion 1210. This uniquely identifies the device to the dynamic user interface proxy. The optional name portion 1220 contains the value "MFG". The "MFG" value indicates the name of the device. The input capabilities portion 1230 contains the values: "TACTILE.KEYBOARD='US_10KEY'" and "TACTILE.KEYBOARD.CURSOR='2'". These values indicate the device has a tactile keyboard that supports a standard US 10 key layout with 2 cursor keys.

The output capabilities portion 1240 contains the value "TACTILE.DYNAMIC_BRAILE='US_STANDARD'". This value indicates the device can output to dynamic Braille elements. The US standard may be used to indicate the number of dynamic Braille elements and/or other characteristics associated with region specific dynamic Braille output.

Figure 7:
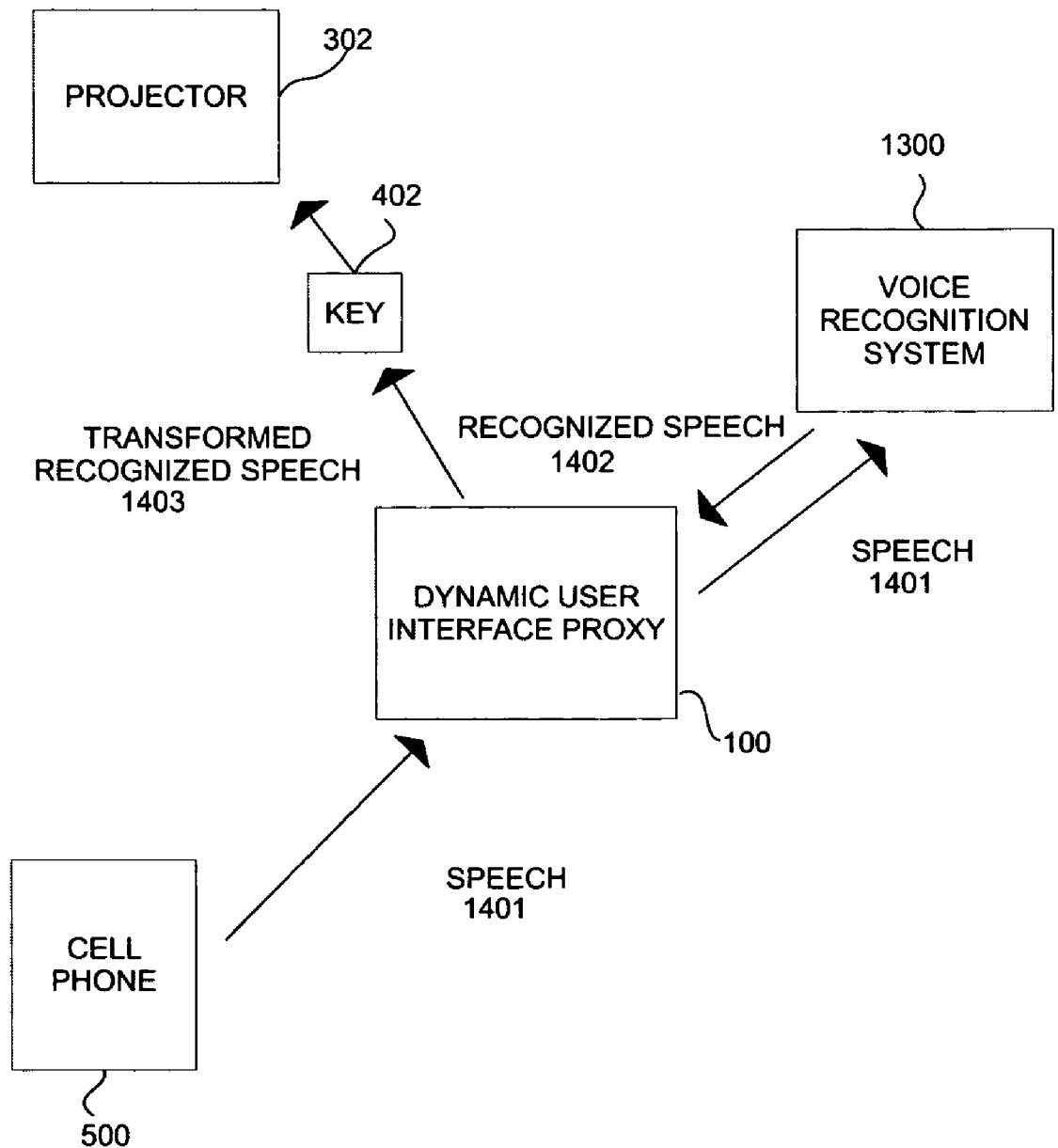
FIG. 7 is a diagram showing an exemplary routing of user interface events according to this invention.

FIG. 7 is a diagram showing an exemplary routing of user interface events according to this invention. A dynamic user interface proxy server 100; a physical key 402; a projector-based generic device 302; a cell-phone user device 500 and a voice recognition system 1300 are logically connected via one or more communication links.

The user of the cell-phone user device 500 is authenticated to the dynamic user interface proxy server 100 using explicit and/or implicit user identifiers. Explicit user identification may include, but is not limited to login key sequences, smart-cards, biometric identifiers and the like. Implicit identifiers include, but are not limited to, control of a key, a token and the like.

The user authenticates the projector-based generic device as an authorized or valid device by associating the physical key 402 with the projector-based generic device 302 and confirming the association over a second communication channel with user device 500. In various exemplary embodiments, the physical key 402 provides a communication connection such as WiFi or Bluetooth for the projector-based generic device 302. In this case, the authentication takes place over the communication link of the physical key. However, in various other embodiments, the Ethernet, WiFi and/or other communications link of the projector generic device 301 is used.

The physical key 402 is associated with the projector generic device 302. In one embodiment, the physical key 402 is associated with the projector-based generic device 302 by proximity. For example, the physical key can be placed on an authentication pad, inserted into the projector-based generic device 302 and/or associated with the physical key 402 using any other method of association. In another embodiment, the physical proximity of the physical key 402 to the projector-based generic device 302 causes the physical key 402 to digitally sign the MAC or IP address, channel id and/or other identifier associated with the projector-based generic device 302. The digital signature may be based on a public key identifier associated with the physical key 402 and the like. The receipt of the digitally signed identifier authenticates the projector-based generic device 302 to send/receive user interface events associated with the user.

The cell phone user device 500 is then used to provide input to the projector generic device 302. In various embodiments, the projector generic device 30 is a smart projector capable of loading slide shows and capable of accepting user input to control the presentation. The dynamic user interface proxy 100 acts as a proxy allowing entry of user interface events on the cell phone user device 500. The entered user interface events are then transformed into appropriate responses for the projector generic device 302 based on the association established between the user cell phone device 500 and generic device 302. Thus, an expected "next slide" key sequence for the projector generic device 302 is entered by selecting the down cursor key on the cell-phone user device 500. The down cursor key of the cell phone user device 500 is received by the dynamic user interface proxy 100 and transformed into the appropriate commands for the generic projector-based device 302.

In various other embodiments, a voice recognition system 1300 is accessed by dynamic user interface the proxy 100 to convert the "next slide" speech based user interface event 1401 into the recognized speech 1402. The recognized speech 1402 is then transformed into the appropriate control command type of user interface event suitable for the projector-based generic device 302. The transformations are based on the device information maintained by the dynamic user interface proxy 100. In still other embodiments, one or more web-services are invoked to determine the syntax and semantics of the control commands to be sent over the wireless or wired communications link to the projector-based generic device 302. This allows the dynamic user interface proxy 100 to more quickly and more transparently add support for new devices and services.

Each of the circuits 10-80 of the dynamic user interface proxy 100 described in FIG. 4 can be implemented as portions of a suitably programmed general-purpose computer. Alternatively, circuits 10-80 of the dynamic user interface proxy 100 outlined above can be implemented as physically distinct hardware circuits within an ASIC, or using a FPGA, a PDL, a PLA or a PAL, or using discrete logic elements or discrete circuit elements. The particular form each of the circuits 10-80 of the dynamic user interface proxy 100 outlined above will take is a design choice and will be obvious and predicable to those skilled in the art.

Moreover, the dynamic user interface proxy 100 and/or each of the various circuits discussed above can each be implemented as software routines, managers or objects executing on a programmed general purpose computer, a special purpose computer, a microprocessor or the like. In this case, the dynamic user interface proxy 100 and/or each of the various circuits discussed above can each be implemented as one or more routines embedded in the communications network, as a resource residing on a server, or the like. The dynamic user interface proxy 100 and the various circuits discussed above can also be implemented by physically incorporating the dynamic user interface proxy 100 into software and/or a hardware system, such as the hardware and software systems of a web server or a client device.

As shown in FIG. 4, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1-2 and 4 can each be any known or later developed device or system for connecting a communication device to the dynamic user interface proxy 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of dynamically directing user interface events between a user device of the user and a generic device in communication with a dynamic user interface proxy, the method at the dynamic user interface proxy comprising:
   determining the user;
   determining capability information for the user device;
   determining capability information for the generic device;
   determining a physical key associated with the generic device;
   receiving, over a first communication channel, a proposed dynamic association for the generic device to communicate user interface events associated with the user device based on the physical key;
   receiving, over a second communication channel, a confirmation of the proposed dynamic association for the generic device from the user device for authenticating the generic device;
   receiving user interface events from the user device;

transforming the user interface events based on at least one of: the user device capabilities and the generic device capabilities; and sending the transformed user interface events to the generic device, wherein the proposed dynamic association and the transformed user interface events received by the generic device exclude information required for completing the authenticating of the generic device.

2. The method of claim 1, in which the physical key is comprised of at least one of: a contact connector and a contact-less connector.

3. The method of claim 2, in which the contact connector is at least one of: a universal serial bus connector; a parallel port connector, a serial port connector; a Firewire connector; an Ethernet connector; a smartcard connector; a Memorystick connector.

4. The method of claim 2, in which the contact-less connector is based on at least one of: WiFi, WiMax, Bluetooth, and infrared.

5. The method of claim 1, in which the user device is at least one of: an audio; a visual; and a tactile device.

6. The method of claim 5, in which the audio user device is a microphone.

7. The method of claim 5, in which the visual user device is at least one of: a projector; a television and a display monitor.

8. The method of claim 5, in which the tactile user device is at least one of: a keyboard; a switch; a remote control; and a touch-panel.

9. The method of claim 5, in which the user device is at least one of: a land-line telephone, a voice-over-ip telephone, a personal digital assistant, a connected home control panel; a communication-enabled wrist-watch; a enabled music player; a radio-transmitter for voice; a communication-enabled digital camera; a communication-enabled video camera; a communication-enabled personal music player; a communication-enabled personal video player.

10. The method of claim 1, in which the generic device is at least one of an: audio; visual; and tactile device.

11. The method of claim 10, in which the generic audio device is a microphone.

12. The method of claim 10, in which the generic visual device is at least one of: a projector; a television and a display monitor.

13. The method of claim 10, in which the generic tactile device is at least one of: a keyboard; a switch; a remote control; and a touch-panel.

14. The method of claim 1, in which the transformations are at least one of: web-services; remote procedure calls (RPCs); remote method invocations (RMIs) and table look-ups.

15. The method of claim 14, in which the transformations change one or more user interface events from a first user interface mode to a second user interface mode.

16. The method of claim 15, in which the user interface modes are at least one of: audio, video, tactile, olfactory and taste.

17. The method of claim 16, in which the first user interface mode is different from the second user interface mode.

18. The method of claim 1, in which routing of the user interface events is further based on dynamic associations between the user, at least one user device and at least one generic device based on at least one physical key.

19. The method of claim 18, in which the physical key is one of: active and passive.

20. The method of claim 1, in which the generic device is at least one of: a printer, a facsimile and speakers.

21. The system of claim 1, in which the generic device is at least one of: a printer, a facsimile and speakers.

22. The method of claim 1, wherein the user identifier is selected from the following:
password,
key sequence,
voice print, and
device identifier number of the user device.

23. The method of claim 1, wherein the user interface event entered into the user device is selected from one or more of the following:
voice command,
mouse movement,
touchpad selection, and
key entry.

24. A system for dynamically directing user interface events comprising:
an input and output interface;
a memory for storing a first set of associations between users, user devices and physical keys; and
a processor that determines a user and capability information for a user device and a generic device;
wherein the processor determines a first authorization for the generic device to communicate user interface events associated with the user device based on a physical key associated with the generic device and a second authorization for the generic device based on a confirmation received from the user device, the first authorization being a proposed dynamic association received from the generic device on a first channel and the second authorization being a confirmation received from the user device on a second channel for authenticating the generic device; and
wherein identified user interface events on the user device and the generic device are routed based on the physical key,
wherein the processor transforms the user interface events based on at least one of the user device capabilities and the generic device capabilities, and
wherein the proposed dynamic association and the transformed user interface events received by the generic device exclude information required for completing the authenticating of the generic device.

25. The system of claim 24, in which the physical key is comprised of at least one of: a contact connector and a contact-less connector.

26. The system of claim 25, in which the contact connector is at least one of: a universal serial bus connector; a parallel port connector, a serial port connector; a Firewire connector; an Ethernet connector; a smartcard connector; and a Memorystick connector.

27. The system of claim 25, in which the contact-less connector is based on at least one of: WiFi, WiMax, Bluetooth, and infrared.

28. The system of claim 24, in which the user device is at least one of: an audio; a visual; and a tactile device.

29. The system of claim 28, in which the audio user device is a microphone.

30. The system of claim 28, in which the visual user device is at least one of: a projector; a television and a display monitor.

31. The system of claim 28, in which the tactile user device is at least one of: a keyboard; a switch; a remote control; and a touch-panel.

32. The system of claim 28, in which the user device is at least one of: a land-line telephone, a voice-over-ip telephone, a personal digital assistant, a connected home control panel;

a communication-enabled wrist-watch; a enabled music player; a radio-transmitter for voice; a communication-enabled digital camera; a communication-enabled video camera; a communication-enabled personal music player; a communication-enabled personal video player.

33. The system of claim 24, in which the generic device is at least one of an: audio; visual; and tactile device.

34. The system of claim 33, in which the audio generic device is a microphone.

35. The system of claim 33, in which the visual generic device is at least one of: a projector; a television and a display monitor.

36. The system of claim 33, in which the tactile generic device is at least one of: a keyboard; a switch; a remote control; and a touch-panel, a printer, a facsimile and speakers.

37. The system of claim 24, in which the transformations are at least one of: web-services; remote procedure calls (RPCs); remote method invocations (RMIs) and table look-ups.

38. The system of claim 37, in which the transformations change one or more user interface events from a first user interface mode to a second user interface mode.

39. The system of claim 38, in which the user interface modes are at least one of: audio, video, tactile, olfactory and taste.

40. The system of 24, in which routing of the user interface events is further based on dynamic associations between the user, at least one user device and at least one generic device based on at least one physical key.

41. The system of claim 40, in which the physical key is one of: active and passive.

42. The system of claim 24, wherein the physical key comprises:
 an identifier for retrieving previously specified associations between the physical key and at least one user device; and
 a connector for proposing a dynamic association with a generic device in which the proposed dynamic association is communicated over a communication channel that is associated with at least one of: the physical and the generic device.

43. The system of claim 24,
 wherein the generic device is a personal computer,
 wherein the user device is a cellular phone, and
 wherein the user authentication circuit authenticates the user based on one or more of a login key sequence and a biometric information.

44. Computer readable storage medium comprising: computer readable program code embodied on the computer readable storage medium, the computer readable program code usable to program a computer to dynamically direct user interface events between a user device of the user and a generic device in communication with a dynamic user interface proxy, the method at the dynamic user interface proxy comprising:
 determining the user;
 determining capability information for the user device;
 determining capability information for the generic device;
 determining a physical key associated with the generic device;
 receiving, over a first communication channel, a proposed dynamic association for the generic device to communicate user interface events associated with the user device based on the physical key;
 receiving, over a second communication channel, a confirmation of the proposed dynamic association for the generic device from the user device for authenticating the generic device;
 receiving user interface events from the user device;
 transforming the user interface events based on at least one of: the user device capabilities and the generic device capabilities; and
 sending the transformed user interface events to the generic device,
 wherein the proposed dynamic association and the transformed user interface events received by the generic device exclude information required for completing the authenticating of the generic device.

* * * * *